United States Patent [19]

Kyung et al.

[11] 4,205,048
[45] May 27, 1980

[54] LIQUID-LIQUID EXTRACTION OF CU, CO, NI FROM AMMONIACAL SOLUTIONS WITH 7-ETHYL-UNDECA-2,4-DIONE

[75] Inventors: Jai H. Kyung; Harvey J. Richards, both of Columbus, Ohio

[73] Assignee: Sherex Chemical Company, Inc., Columbus, Ohio

[21] Appl. No.: 10,354

[22] Filed: Feb. 8, 1979

Related U.S. Application Data

[63] Continuation of Ser. No. 867,660, Jan. 9, 1978, abandoned.

[51] Int. Cl.$^2$ .................. C01G 3/00; C01G 51/00; C01G 53/00; C07C 49/12
[52] U.S. Cl. .................................... 423/24; 423/139; 75/101 BE; 568/412
[58] Field of Search ............... 423/24, 139, DIG. 14; 75/101 BE; 260/590 R, 593

[56] References Cited

U.S. PATENT DOCUMENTS

| | | | |
|---|---|---|---|
| 2,313,621 | 3/1943 | Bruson | 260/590 R |
| 2,864,850 | 12/1958 | Westfahl | 260/590 R |
| 3,700,416 | 10/1972 | Lucid | 423/24 |
| 4,065,502 | 12/1977 | MacKay | 423/24 |
| 4,152,396 | 5/1979 | MacKay | 423/139 |

OTHER PUBLICATIONS

Stary, *The Solvent Extraction of Metal Chelates*, Pergamon Press Ltd. (1964) pp. 32, 51–79.
Koshimura, H. "Effect of Substituents on the Solubilities of Alkyl-Substituted B–Diketone Copper Chelates", *J. Inorg. Nucl. Chem.* (1976) vol. 38, pp. 1705–1712.
Tavares et al. "Solvent Extraction Studies With Decan-2,4 Dione" *J. Inorg. Nucl. Chem.* (1976) vol. 38, pp. 1357–1365.
Schweitzer et al. "Extractions With B–Diketones as Chelating Solvents" *Analytica Chimia Acta* 36 (1966) pp. 77–89.

*Primary Examiner*—Brian E. Hearn
*Attorney, Agent, or Firm*—Burton A. Amernick; Edward B. Dunning

[57] ABSTRACT

7-Ethyl-undeca-2,4-dione as a chelation collector for the liquid-liquid extraction of transition metals from dilute ammoniacal leach solutions thereof exhibits the combination of requisite physical and dynamic properties marking an industrially attractive reagent for this purpose.

1 Claim, No Drawings

LIQUID-LIQUID EXTRACTION OF CU, CO, NI FROM AMMONIACAL SOLUTIONS WITH 7-ETHYL-UNDECA-2,4-DIONE

This is a continuation of application Ser. No. 867,660, filed Jan. 9, 1978, abandoned.

BACKGROUND OF THE INVENTION

1. Field of the Invention

This invention relates to the compound 7-ethyl-undeca-2,4-dione.

2. Description of the Prior Art

Considerable attention of recent has been directed to the commercial refining of transition base metals by the liquid-liquid extraction method. In accordance with this method, a water-immiscible organic solvent containing an organic extractant or chelating agent is intimately contacted with a dilute metal-bearing aqueous leach solution whereupon the two phases are permitted to separate. After separation from the metal-depleted aqueous solution or raffinate, the metal-loaded organic phase is contacted with an aqueous solution of a strong acid in a stripping operation to effect the transfer of the metal values from the organic phase back to an aqueous phase to provide a suitably concentrated solution thereof for subsequent recovery by electrolysis. The stripped organic phase is recycled to treat a fresh aqueous feed solution whereas the raffinate is recycled to the leaching operation.

The extractant reagents most commonly in use at the present time for this purpose are either the substituted oxine or hydroxy oxime type. These reagents find principal use in the recovery of copper from acid leach solutions thereof in which type of system they have proven to be very effective. Although these reagents can be used to extract metals from ammoniacal leach solutions, a problem arises in so doing which is not encountered in the refining of acid solutions. Briefly stated, the problem is that both of the indicated extractants, because of their related chemical nature, commonly promote an intolerable degree of ammonia carryover from the extraction stage to the stripping stage and similarly result in almost a mole for mole carryover of acid from the stripping stage to the extraction stage. The net result of these carryovers beyond involving the costly wasteful consumption of ammonia, is that ammonium sulfate forms and builds up to a point whereby the efficiency of the operation is seriously impeded. It is accordingly the object of this invention to provide a chelation reagent which obviates the foregoing problem associated with the use of the substituted oxine or hydroxy oxime type reagents.

SUMMARY OF THE INVENTION

In accordance with the present invention, 7-ethyl-undeca-2,4-dione is provided as an effective chelation collector for the liquid-liquid extraction of transition base metals from dilute ammoniacal leach solutions thereof. The unique feature of said compound in respect of this use is that in the extraction step the base metal is capable of being loaded to almost the exclusion of ammonia, thereby resulting in essentially a nil carryover of ammonia to the stripping step. Moreover, in the stripping step the contemplated extractant does not form a salt with the acid present and hence can be recycled directly to the extraction stage without the necessity of further treatment.

DESCRIPTION OF THE PREFERRED EMBODIMENT

The compound 7-ethyl-undeca-2,4-dione can be readily prepared by the Claisen condensation of 5-ethyl-nonan-2-one and methyl acetate in the presence of a suitable base and an inert organic solvent, all as will be exemplified in the working example to follow. Further details with respect to this reaction using the preferred base; viz., sodium hydride, can be found set forth in *J. Amer. Chem. Soc.*, 72, 1352–1355 (1050).

The operative details associated with the ion exchange metal extraction method concerned herein are widely reported in the literature, and hence need not be discussed or exemplified for the purpose of adequately illustrating the present invention. Accordingly, standardized testing procedures of a static nature will be resorted to in order to validly point up the overall potential of the contemplated reagent for refining ammoniacal leach solutions. Such leach solutions as encountered in commercial operations are usually comprised of copper, cobalt and nickel ions. This expose will therefore enable those skilled in the art to use the invention in the framework of the best practices currently observed by the relevant industry. With the foregoing in mind, the following comprehensive working example is given.

PREPARATION OF 7-ETHYL-UNDECA-2,4-DIONE

A two liter, three-necked flask equipped with condenser was purged with nitrogen and charged with 48 g (2 moles) of sodium hydride and 176 g (2 moles) of ethyl acetate in 100 ml. of diethyl ether. 5-ethyl-nonan-2-one in the amount of 170 g (1 mole) was added slowly under nitrogen atmosphere for 2 hours.

If the reaction fails to start upon addition of one-tenth of the ketone, the addition of 3 ml. of absolute ethanol will serve to initiate the reaction. The mixture was heated with stirring at 40°–45° C. during the addition of the ketone. 30 ml. of absolute ethanol was then added slowly and the reaction mixture stirred until evolution of hydrogen ceased.

The mixture was poured slowly into a mixture of 183 ml. of concentrated hydrochloric acid and 400 g of ice and stirred until all solids disappeared. The organic layer was separated out and the aqueous layer extracted with equal volume of ether. The combined organic layer was washed with 10% sodium bicarbonate solution and then with water. The organic phase was then dried over sodium sulfate and the ether stripped on an evaporator. The product, 7-ethyl-undeca-2,4-dione, was distilled at 144°–146° C./15 mm (71% yield, 94% pure).

COPPER LOADING

For the purpose of determining copper loading characteristics of 7-ethyl-undeca-2,4-dione, 0.25 mole of the reagent was dissolved in a liter of Escaid 200 to provide the organic phase. An aqueous phase approximating the equilibrium characteristics of a typical ammoniacal leach solution of copper was prepared comprising 150 gpl of ammonium sulfate, 10 gpl of copper as the sulfate salt and adjusted to a pH of 9 through the addition of ammonium hydroxide. The loading was conducted at an organic to aqueous volumetric ratio (O/A) of 1/1. Two contacts with fresh aqueous (50 ml each) were made on a basis of a two-minute shake-out time and the two raffinates were then combined for analysis. The amount of loaded copper was determined by doubling the difference between the metal content of the feed solution and that of the combined raffinates with the respective contents expressed in terms of gpl. Stripping was accomplished with one contact of 100 gpl sulfuric acid for a two-minute shake-out observing an O/A ratio of 1/1.

In accordance with this test procedure, the organic phase loaded 7.4 gpl Cu as compared to a theoretical loading capacity of 7.94 gpl. The stripped aqueous phase analyzed 7.22 gpl Cu. The loading is therefore 91% of theory based on the analysis of the strip solution or 93% based on the difference between the feed and combined raffinates as reflected by analysis.

COBALT/NICKEL SELECTIVITY

The aqueous feed solution for this illustration was prepared in the manner described directly above to provide an initial stock solution having a pH of 9 and containing approximately 5 gpl Ni and 5 gpl Co as the sole metal content. Feed solutions of pH 8.5 and 8.0 were obtained by adding concentrated $H_2SO_4$ to aliquots of the stock solution. The organic phase again consisted of a solution of 0.25 mole of the β-diketone in a liter of Escaid 200. Extraction and stripping were carried out in the identical manner as outlined above using aqueous $H_2SO_4$ of pH 0 as the strip solution. The analytical results for this series of runs are set forth in the following Table I.

TABLE I

| Run | Fraction | pH | Ni-Co (gpl total) | Organic Loading (gpl) | % Stripped | Co (gpl) | Ni (gpl) | Co/Ni |
|---|---|---|---|---|---|---|---|---|
| 1 | Feed | 9.05 | 10.01 | | | 5.15 | 4.86 | 1.06 |
|   | Raffinate | — | 6.08 | | | 2.73 | 3.35 | .81 |
|   | Strip | — | 8.00 | 7.86 | 101.8 | 5.14 | 2.86 | 1.8 |
| 2 | Feed | 8.50 | 9.37 | | | 5.28 | 4.09 | 1.29 |
|   | Raffinate | — | 5.83 | | | 2.68 | 3.15 | .85 |
|   | Strip | — | 7.52 | 7.74 | 97.2 | 5.34 | 2.18 | 2.45 |
| 3 | Feed | 8.00 | 9.76 | | | 5.15 | 4.61 | 1.12 |
|   | Raffinate | — | 6.63 | | | 2.97 | 3.66 | .81 |
|   | Strip | — | 6.11 | 6.26 | 97.6 | 4.24 | 1.87 | 2.27 |

COPPER/COBALT SELECTIVITY

Following the identical procedure noted above for determining Co/Ni selectivity, comparable data were developed using a synthetic leach solution containing about 5 gpl copper and 7 gpl cobalt. The extraction and stripping results obtained are given in the following Table II.

TABLE II

| Run | Fraction | pH | Total (gpl) Cu | Total (gpl) Co | Organic Loading (gpl) | % Stripped | Cu/Co |
|---|---|---|---|---|---|---|---|
| 1 | Feed | 9.0 | 5.26 | 7.08 | | | 0.74 |
|   | Raffinate | — | 2.55 | 6.00 | | | 0.425 |
|   | Strip | — | 5.24 | 2.23 | 7.58 | 98 | 2.35 |
| 2 | Feed | 8.5 | 5.04 | 7.03 | | | 0.72 |
|   | Raffinate | — | 1.63 | 6.33 | | | 0.26 |
|   | Strip | — | 6.50 | 1.03 | 8.22 | 92 | 6.31 |
| 3 | Feed | 8.0 | 4.95 | 6.95 | | | 0.71 |
|   | Raffinate | — | 1.24 | 7.23 | | | 0.17 |
|   | Strip | — | 7.14 | 0.45 | 8.04 | 94 | 15.87 |

AMMONIA CARRYOVER

The reagent 7-ethyl-undeca-2,4-dione was compared with a commercial hydroxy oxime type reagent (LIX 64N-General Mills) for ammonia carryover characteristics, the latter reagent being recognized as superior in this regard to the commercially available substituted oxine type extractants.

The organic phase in each instance contained 0.2 mole of the respective reagents in a liter of Escaid 200. After washing the organic samples once with de-ionized (D.I.) water, a 10 ml aliquot of each was measured for pH in 300 ml of D.I. $H_2O$. The respective samples were then vigorously contacted for 2 minutes with an equal volume of a solution of 80 gpl $Na_2SO_4$ and 240 gpl of 29% $NH_4OH$ in D.I. $H_2O$. After settling for 2 hours, the organic phases were centrifuged and the pH of a 10 ml aliquot thereof in 300 ml D.I. $H_2O$ was determined. The results obtained are set forth in the following Table III.

TABLE III

| Reagent | pH after $H_2O$ Wash | pH after $NH_4OH$ Contact | gpl $NH_4OH$ Carryover |
|---|---|---|---|
| LIX 64N | 6.95 | 10.60 | 1.36 |
| β-diketone | 6.50 | 9.25 | 0.06 |

What is claimed is:

1. In a liquid-liquid ion exchange process for the recovery of copper, cobalt or nickel values from a dilute ammoniacal solution thereof whereby said ammoniacal solution is contacted with an organic solution of a metal chelating agent to effect transfer of said metal values to the organic phase and whereupon the metal-loaded organic phase is then separated and contacted with an aqueous solution of a strong acid to effect transfer of the metal values to said aqueous acid phase from whence the metal values are recovered; the improvement wherein the metal chelating agent is 7-ethyl-undeca-2,4-dione.

* * * * *